(12) United States Patent
Lewis

(10) Patent No.: US 11,194,586 B2
(45) Date of Patent: Dec. 7, 2021

(54) SECURE BOOT OVERRIDE IN A COMPUTING DEVICE EQUIPPED WITH UNIFIED-EXTENSIBLE FIRMWARE INTERFACE (UEFI)-COMPLIANT FIRMWARE

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 14/267,376

(22) Filed: May 1, 2014

(65) Prior Publication Data

US 2014/0331037 A1 Nov. 6, 2014

Related U.S. Application Data

(60) Provisional application No. 61/818,197, filed on May 1, 2013.

(51) Int. Cl.
*G06F 9/00* (2006.01)
*G06F 15/177* (2006.01)
*G06F 9/4401* (2018.01)
*G06F 21/57* (2013.01)

(52) U.S. Cl.
CPC .......... *G06F 9/4401* (2013.01); *G06F 21/575* (2013.01); *G06F 2221/033* (2013.01)

(58) Field of Classification Search
CPC .............................. G06F 9/4401; G06F 21/575
USPC ............................................................ 713/2
See application file for complete search history.

(56) References Cited

U.S. PATENT DOCUMENTS

| 9,015,456 B1* | 4/2015 | Spangler | G06F 9/4403 711/100 |
| 2009/0037722 A1* | 2/2009 | Chong | G06F 1/24 713/2 |
| 2012/0159136 A1* | 6/2012 | Rothman | G06F 9/4401 713/2 |
| 2012/0166780 A1* | 6/2012 | Ziarnik | G06F 9/4401 713/1 |

(Continued)

FOREIGN PATENT DOCUMENTS

| CN | 102541607 A | 7/2012 |
| CN | 103034510 A | 4/2013 |
| WO | 2012/139026 A2 | 10/2012 |

OTHER PUBLICATIONS

Unified EFI, Inc., Unified Extensible Firmware Interface Specification, Version 2.3.1, Errata C. Jun. 27, 2012. 2224 pages.

*Primary Examiner* — Robert A Cassity
(74) *Attorney, Agent, or Firm* — McCarter & English, LLP; John S. Curran

(57) ABSTRACT

A firmware-based system and method for detecting an indicator of an override condition during a Unified Extensible Firmware Interface (UEFI) Secure Boot sequence. The indicator of the override condition may be detected based upon the pressing of a specialized button, designated key or keys or other received input that indicates both physical presence of the user and the desire, on the current boot, to bypass UEFI Secure Boot. An embodiment may work for only a single boot, not require access into a setup application, and may be accessed by externally accessible features of the computer system.

15 Claims, 5 Drawing Sheets

(56) References Cited

U.S. PATENT DOCUMENTS

| | | | | |
|---|---|---|---|---|
| 2013/0104188 A1* | 4/2013 | Western | ............... | G06F 21/57 |
| | | | | 726/1 |
| 2013/0124843 A1* | 5/2013 | Bobzin | ............... | G06F 21/575 |
| | | | | 713/2 |
| 2013/0191622 A1* | 7/2013 | Sasaki | ............... | G06F 9/4401 |
| | | | | 713/2 |

* cited by examiner

SECURE BOOT OVERRIDE IN A COMPUTING DEVICE EQUIPPED WITH UNIFIED-EXTENSIBLE FIRMWARE INTERFACE (UEFI)-COMPLIANT FIRMWARE

RELATED APPLICATION

This application is related to, and claims the benefit of, U.S. Provisional Patent Application No. 61/818,197, entitled "System and Method for Secure Boot in a Unified Extensible Firmware Interface (UEFI)-Compliant Computing Device", filed May 1, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written into Read-Only Memory (ROM) modules including, but not limited to, ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

UEFI is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the initial 'power-applied' state to 'fully operational.' The specification tells the desired result but deliberately does not specify the internal firmware implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in ROM. In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

Modern computer systems are vulnerable to malicious attack. During the booting process, the handoff from the firmware to the operating system presents a potential vulnerability where malicious software could gain control of the system. With the advent of systems using the UEFI standard for booting the operating system, this handoff is a well-documented process involving the invocation of an OS loader executable loaded from local or remote media. Beginning with the UEFI 2.3 specification, provisions were added to the UEFI specification for the firmware to check the Operating System (OS) loader executable and/or other executables that are to be executed before the OS takes over and to decide whether the executable was trustworthy. This provision of the UEFI specification, known as UEFI Secure Boot, contains detailed provisions for populating and updating a database of "keys" which the firmware can use to authenticate the signature embedded in these executables.

BRIEF SUMMARY

Embodiments of the present invention provide a firmware-based system and method utilizing an extra step during the UEFI Secure Boot sequence to detect a Secure Boot override condition. This condition is detected as the pressing of a button or combination of buttons to indicate both physical presence of the user and the desire, on the current boot, to bypass UEFI Secure Boot. An embodiment may work for only a single boot, not require access into a setup application and may be accessed by externally accessible features of the computer system.

In one embodiment, method for bypassing a Secure Boot sequence in a computing device equipped with UEFI-compliant firmware includes beginning, with the UEFI-compliant firmware, execution of a boot sequence for the computing device. The firmware detects during execution of the boot sequence that a Secure Boot configuration setting is enabled. The method further detects an indication of a Secure Boot override condition during execution of the boot sequence. The indication of the Secure Boot override condition is generated after the beginning of the boot sequence. The method then continues the boot sequence without signature checking an executable based on the detection of the indication of the Secure Boot override condition and invokes the executable.

In another embodiment, a computing device includes an interface for an input device, a processor and read-only memory. The read-only memory holds UEFI-compliant firmware configured to execute a boot sequence for the computing device. The UEFI-compliant firmware begins execution of the boot sequence and detects, during execution of the boot sequence, that a Secure Boot configuration setting is enabled. The firmware also detects, during execution of the boot sequence, an indication of a Secure Boot override condition. The indication is generated after the beginning of the boot sequence. Based on the detecting of the indication of the Secure Boot override condition, the firmware continues the boot sequence without signature checking an executable and invokes the executable.

In one embodiment, a non-transitory medium holds computer-executable instructions for bypassing a Secure Boot sequence in a computing device equipped with UEFI-compliant firmware. The computing device begins, with the UEFI-compliant firmware, execution of a boot sequence that detects an expansion card in the computing device. The computing device also detects, during execution of the boot sequence, that a Secure Boot configuration setting is enabled. The computing device further detects, during execution of the boot sequence, an indication of a Secure Boot override condition. The indication of the Secure Boot override condition is generated after the beginning of the boot sequence. The computing device continues the boot sequence without signature checking a driver for an expansion card based on the detection of the indication of the Secure Boot override condition and loads the driver for the expansion card.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Figure 1:
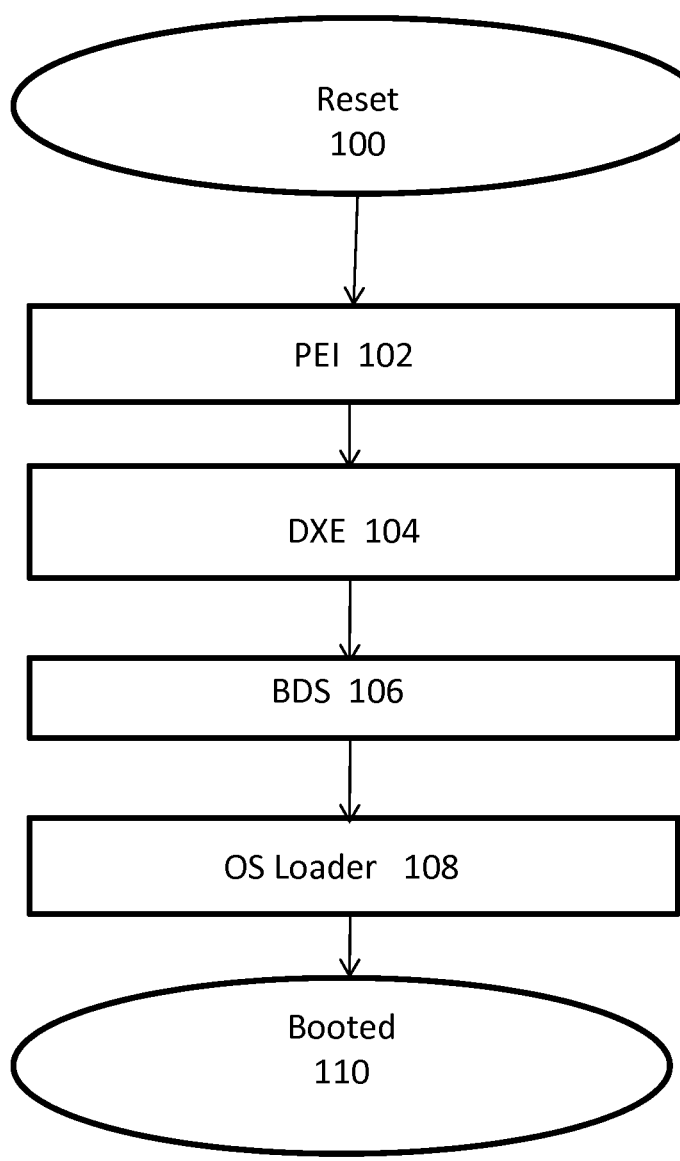
FIG. 1 (prior art) depicts an exemplary sequence of steps performed during a conventional UEFI boot sequence.

While not required by the UEFI specification, many firmware implementations contain provisions to disable UEFI Secure Boot in order to load operating systems that do not start up using signatures. This is necessary in various cases, such as for older operating systems that were developed prior UEFI 2.3, or during development of an OS loader. Firmware implementations often contain a configuration setting within their built-in setup application to disable Secure Boot. This configuration setting is protected so that it can only be changed by a user who is physically present with the system to give a form of permission before these unsigned operating system boot executables will be allowed on the system.

However, in many cases, the desire to boot one of these unsigned OS executables is a one-time event rather than a desire of policy. Unfortunately, configuration settings found on many firmware implementations do not "reset" themselves after one boot, leaving open the possibility that the computer system could be left unprotected on subsequent reboots unintentionally because the user forgot to change the setting back. In contrast to these previous approaches, embodiments of the present invention 1) work for a single boot; 2) do not require entry into the setup application to change the configuration; and 3) use externally accessible features of a computer system to accomplish the override of the Secure Boot. This approach may require only a single key press (compared to approximately a dozen keystrokes) to disable the Secure Boot setting and requires several fewer seconds to execute, which, given the industry emphasis on rapid boot processes, is significant.

Embodiments of the present invention insert an extra step during the normal UEFI boot sequence by detecting an indication of a Secure Boot override condition and then bypassing the signature checking of UEFI Secure Boot. This indication of the Secure Boot override condition may take a number of forms. For example, the indication may be detected as the pressing of a button or combination of buttons and/or keys of an input device to indicate both a physical presence of the user and the user's desire, on the current boot, to bypass UEFI Secure Boot. A number of different types of button presses may be used to indicate the desire for Secure Boot override. For example, in one embodiment, a separate power button which powers-on the system, like the normal power button of the computing device, but additionally indicates the desire for bypassing the UEFI Secure Boot, may be depressed. In another embodiment, a particular keyboard key or keys may be depressed which, when detected, indicate the desire for Secure Boot override. It should be noted that in most fast-booting systems, USB keyboards are not enabled until quite late in the boot sequence because of the time required to enumerate the USB bus and enable the USB keyboard and so this embodiment is practical only on systems with other non-USB keyboards (such as I2C or PS/2 or simple matrix). In a different embodiment, the computing system may be configured to detect a holding down of the normal power button for an extended period of time to indicate an override condition. For example, the power button may be held down for a period of time longer than required to start the computing device but shorter than the time interpreted by the computing device as indicating a desire to power down. The exact period of time indicating the override condition is an implementation detail that will vary based upon the particular computing device's power configuration. It should be appreciated that the above examples are not exhaustive and other combinations of buttons, key presses and/or other indicators could be used to indicate a user's desire for a Secure Boot override without departing from the scope of the present invention.

FIG. 1 depicts an exemplary sequence of steps performed by UEFI-compliant firmware during a conventional boot sequence. The standard UEFI boot sequence, as described in the Platform Initialization (PI) specification, is shown in steps 100-110 in FIG. 1. The UEFI Specification technically only covers only a portion of the depicted sequence (approximately between steps 106-110 in FIG. 1) and some platforms cut out the early phases (PEI, Reset). However, the sequence depicted is a typical one for a conventional UEFI boot sequence. The boot sequence begins with reset (step 100) where the computing device begins execution at the CPU's reset vector in the PI security (SEC) phase. After the firmware discovers the location of the first firmware volume and validates its integrity, the sequence jumps into the Pre-EFI Initialization (PEI) phase (step 102). The PEI phase continues until system memory is discovered and the boot mode determined. Once the PEI phase has completed, the Driver Execution Environment (DXE) phase begins which initializes the UEFI environment (step 104). Following the initialization of the complete set of UEFI services, the Boot Device Selection (BDS) phase (step 106) begins. The purpose of the BDS phase is to locate the boot device(s), load the OS loader executable from the selected boot device into memory and begin execution of the OS loader executable (step 108). The OS loader executable takes control of the system from the firmware and then launches the OS environment, at which time the system is considered to have booted (step 110).

Figure 2:
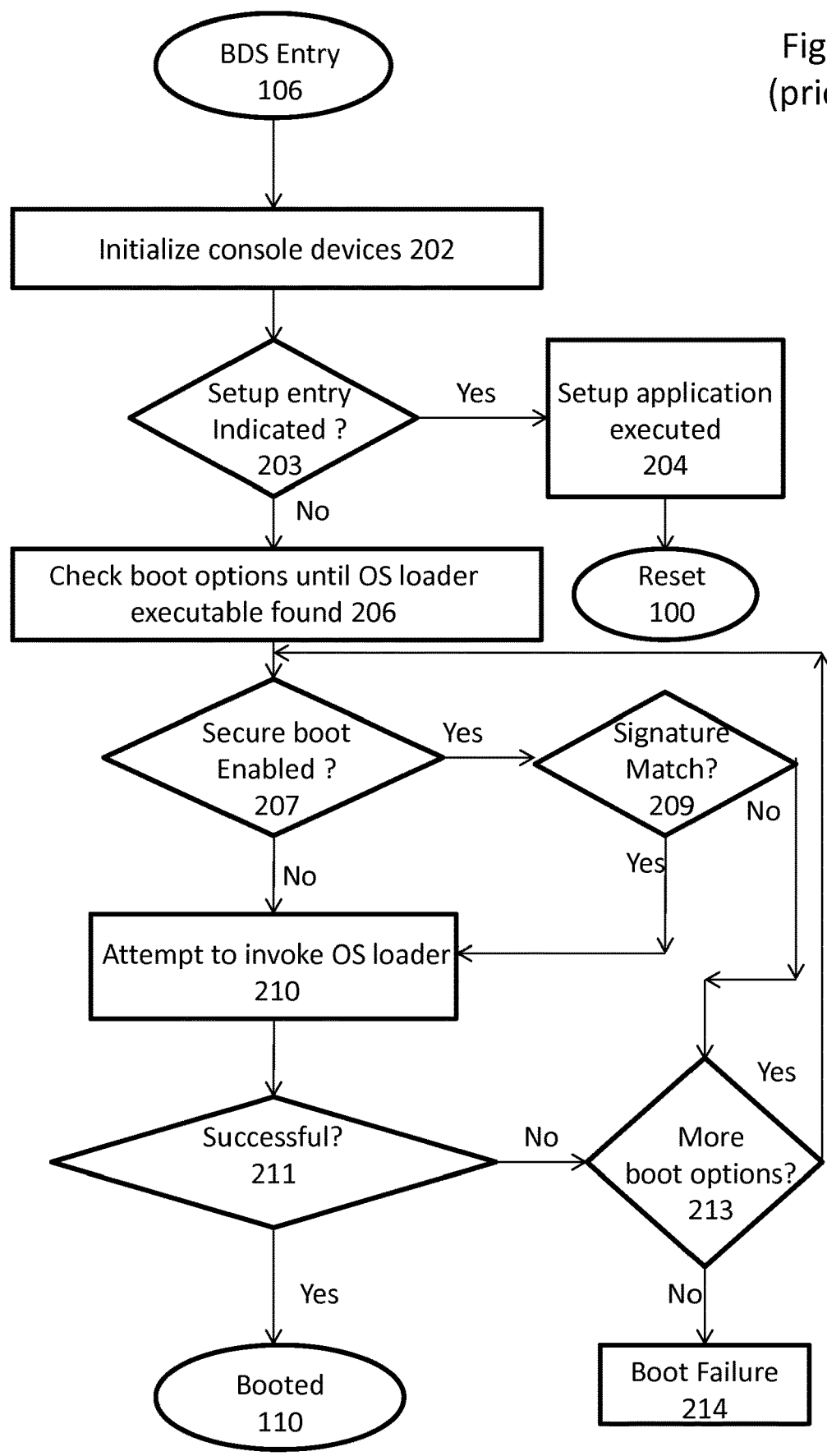
FIG. 2 (prior art) depicts an exemplary sequence of steps performed during a conventional UEFI Secure Boot.

A conventional UEFI Secure Boot process takes place following the beginning of the BDS phase. FIG. 2 depicts an exemplary sequence of steps performed during a conventional UEFI Secure Boot sequence; The BDS phase begins with BDS entry (step 106 of FIG. 1) which is an entry point typically produced by one of the drivers loaded during the DXE phase. The BDS phase initializes the console devices (step 202) including keyboards, pointer devices and any output devices. Then the BDS phase checks to see if the user has indicated a desire to invoke the built-in setup application (step 204). The user can do this with the OsIndications EFI variable (see section 7.5.4 of the UEFI specification) or other means, typically with a key press, such as F2 or Escape. If setup entry is indicated, then the setup application is invoked (step 218). When the setup application is exited, typically the platform resets (step 220) and the boot sequence begins anew.

If the user has not indicated a desire to enter the built-in setup application, a normal boot process begins by cycling through all of the boot options until an OS loader executable is found (step 206). The boot options are recorded in standard UEFI variables, such as BootNext, BootOrder and Boot ####. Usually, the boot device specified by BootNext is tried first, followed by the boot devices specified by the various Boot #### variables, in the order they appear in BootOrder. For each boot device, an attempt is made to find an OS loader executable. If an OS loader executable is found, then a check is made to see whether the Secure Boot configuration setting in the firmware is enabled (step 207). The check is performed inside the UEFI-defined LoadImage( ) boot service (section 6.4) or in the implementation of the UEFI-defined Security Architecture 2 protocol (section 12.9.2 of the PI specification, Volume 2) that is invoked by LoadImage( ). If Secure Boot is not enabled, then an attempt is made to invoke the OS loader executable (step 210). When invocation of the OS loader succeeds (step 211), then the OS loader continues, loads the operating system into memory and the system is booted up (step 110). It should be noted that when invoking an OS loader executable (step 210), it is possible for the boot to still fail, either because the OS loader cannot find the resources to continue or because the UEFI watchdog timer has expired.

If Secure Boot is enabled, then the OS loader executable signature is checked in order to verify the authenticity of the OS loader executable as described in the UEFI specification (step 209). If the signature match succeeds, then the firmware attempts to invoke the OS loader executable as its authenticity has been verified (step 210). When invocation of the OS loader succeeds (step 211), then the OS loader continues, loads the operating system into memory and the system is booted up (step 110). If the signature match (step 209) does not succeed, then the boot sequence moves to the next boot option (step 213). If there are more boot options for the computing device (step 213), the sequence iterates and checks to see whether the Secure Boot configuration setting is enabled (step 207). If there are no more boot options, a boot failure has been experienced (step 214). Boot failure handling varies depending upon the computing device configuration, but a typical technique is to display an error message in response to the failure and give the user an option to enter the computing device's setup application.

Figure 3:
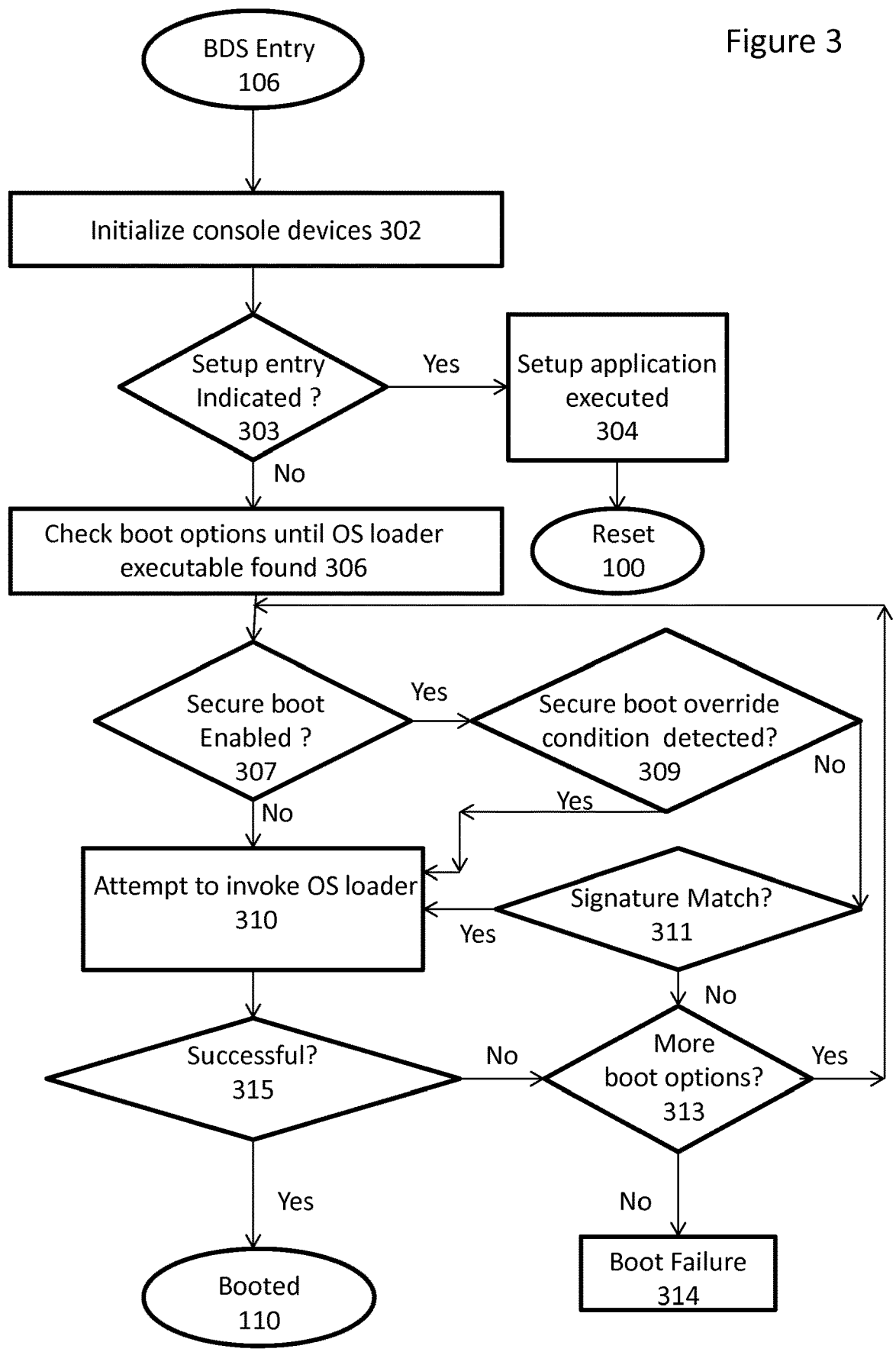
FIG. 3 depicts an exemplary sequence of steps performed by an embodiment of the present invention to bypass a UEFI Secure Boot for an OS loader executable.

Embodiments of the present invention enable a user to bypass the Secure Boot verification described above in FIG. 2 on a one-time basis without the need to enter the computing device's setup application. FIG. 3 depicts an exemplary sequence of steps performed by an embodiment of the present invention to bypass a UEFI Secure Boot. It should be appreciated that although FIG. 3 describes the process for bypassing UEFI Secure Boot for an OS loader executable, the technique is also applicable to other executables (applications) that are required to be signature checked by the UEFI specification before invocation during a UEFI boot sequence.

The boot sequence of FIG. 3 is identical to that of FIG. 2 up until the firmware checking to see whether the Secure Boot configuration setting is enabled (step 307) and so a detailed description of the identical steps will be omitted. In embodiments of the present invention, if Secure Boot is enabled, a second check is made to see whether an indication of a Secure Boot override condition has been detected (step 309). For example, the check for a Secure Boot override condition may involve a check of the current status of pre-specified buttons, or it may require checking a flag set during one of the previous boot phases (SEC, PEI, DXE) or during BDS by one of the button conditions. In some cases, the Secure Boot override is generated by a hardware condition which is temporary, such as a button being held down by the user or by a key being pressed. In these cases, upon detection of the condition, a flag may be set in RAM to record the fact that the condition occurred. In other cases, the Secure Boot override is generated by a condition which is recorded in a hardware register until reset. In these cases, the detection of the condition can simply involve reading of the hardware register. Finally, in some cases it may be desirable to only allow the Secure Boot override while the condition is maintained, such as the user continuing to hold down a button until the booting process is completed. In this case detecting the condition also involves reading of the hardware register where the condition's detection is made available to software. If an indication of a Secure Boot override condition is detected, the firmware bypasses the signature checking required by UEFI Secure Boot notwithstanding Secure Boot being enabled and attempts to invoke the OS loader executable (step 310). If an indication of a Secure Boot Override condition is not detected, the firmware performs the signature checking required by UEFI Secure Boot (step 311) and in the event of a match attempts to invoke the OS loader executable (step 310). When invocation of the OS loader executable succeeds (step 315), then the OS loader executable takes control of the computing device, loads the operating system into memory and the system is booted up (step 110). If the signature match (step 311) does not succeed, or the invocation of the OS loader executable is not successful (step 315), then the boot sequence moves to the next boot option if there is one (step 313). If there are more boot options for the computing device (step 313), the sequence iterates and checks to see whether the Secure Boot configuration setting is enabled (step 307). If there are no more boot options, a boot failure has been experienced that the user may attempt to handle (step 316).

As noted above, the technique for bypassing a UEFI Secure Boot may also be utilized by embodiments of the present invention for other (non-OS loader) executables. The detection of the indicator of the Secure Boot override condition may also serve to bypass signature checking for other executables that would otherwise be signature checked during the boot sequence prior to invocation as a result of the Secure Boot configuration being enabled in the computing device.

Since the embodiments of the present invention enable the UEFI Secure Boot process to be bypassed which may represent a security issue, embodiments provide warning to a user that the Secure Boot is being bypassed. For example, in an embodiment, once an indicator of a Secure Boot override condition is detected, a visual indicator may be generated on a display surface that is in communication with the computing device that alerts a user of the computing device to the override. The indicator may be the display of a screen icon or written text. In one embodiment, an LED may be flashed to attract the user's attention. In another embodiment, the computing device may generate an audible indicator to alert the user to the override condition. Such audible and/or visual indicators may help prevent a situation where inadvertent button/key input triggered the override.

The Secure Boot provisions of the UEFI specification are also applicable to the validation of 3rd party drivers located on expansion cards, such as video cards, LAN cards or RAID controllers. PCI, ExpressCard (a PCIe derivative) and other bus standards specify that such cards can contain their own UEFI driver but since they are from an external source (not the OEM) they represent a security threat and so the drivers for these cards are required to be validated by performing UEFI signature checking prior to loading. Embodiments of the present invention allow the UEFI Secure Boot signature checking of the drivers for these cards to be skipped during the boot sequence so as to allow the cards for a single boot. For example, the signature checking may be skipped for a graphics card where policy for a specific older card might want to allow such a card to be added to the list of "allowed cards" but would require booting in a case where the user could not even see the setup utility. Overriding the Secure Boot allows the video card to be trusted for a single boot so that the policy for that card can be changed.

Figure 4:
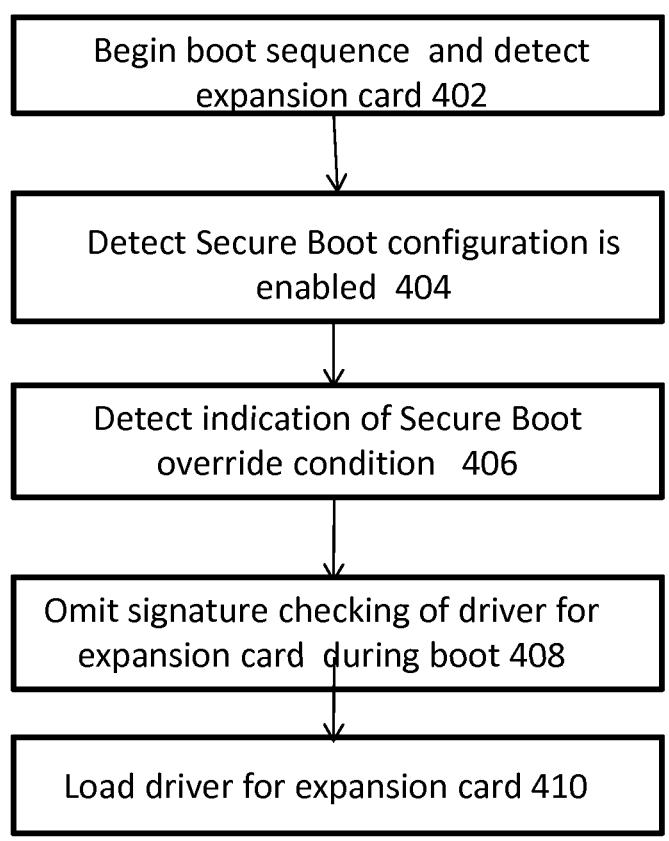
FIG. 4 depicts an exemplary sequence of steps performed by an embodiment of the present invention to bypass a UEFI Secure Boot for a 3$^{rd}$ party driver for an expansion card.

FIG. 4 depicts an exemplary sequence of steps performed by an embodiment of the present invention to bypass a UEFI Secure Boot for a $3^{rd}$ party driver for an expansion card. The sequence begins with the beginning of a boot sequence for the computing device that detects an expansion card (step 402). The firmware detects that a Secure Boot configuration is enabled (step 404) but also detects an indication of a Secure Boot override condition (step 406). Based on the detection of the Secure Boot override condition (step 406), signature checking for a $3^{rd}$ party driver for the expansion card is omitted (step 408) the boot sequence continues and the driver for the expansion card is loaded into memory (step 410).

Figure 5:
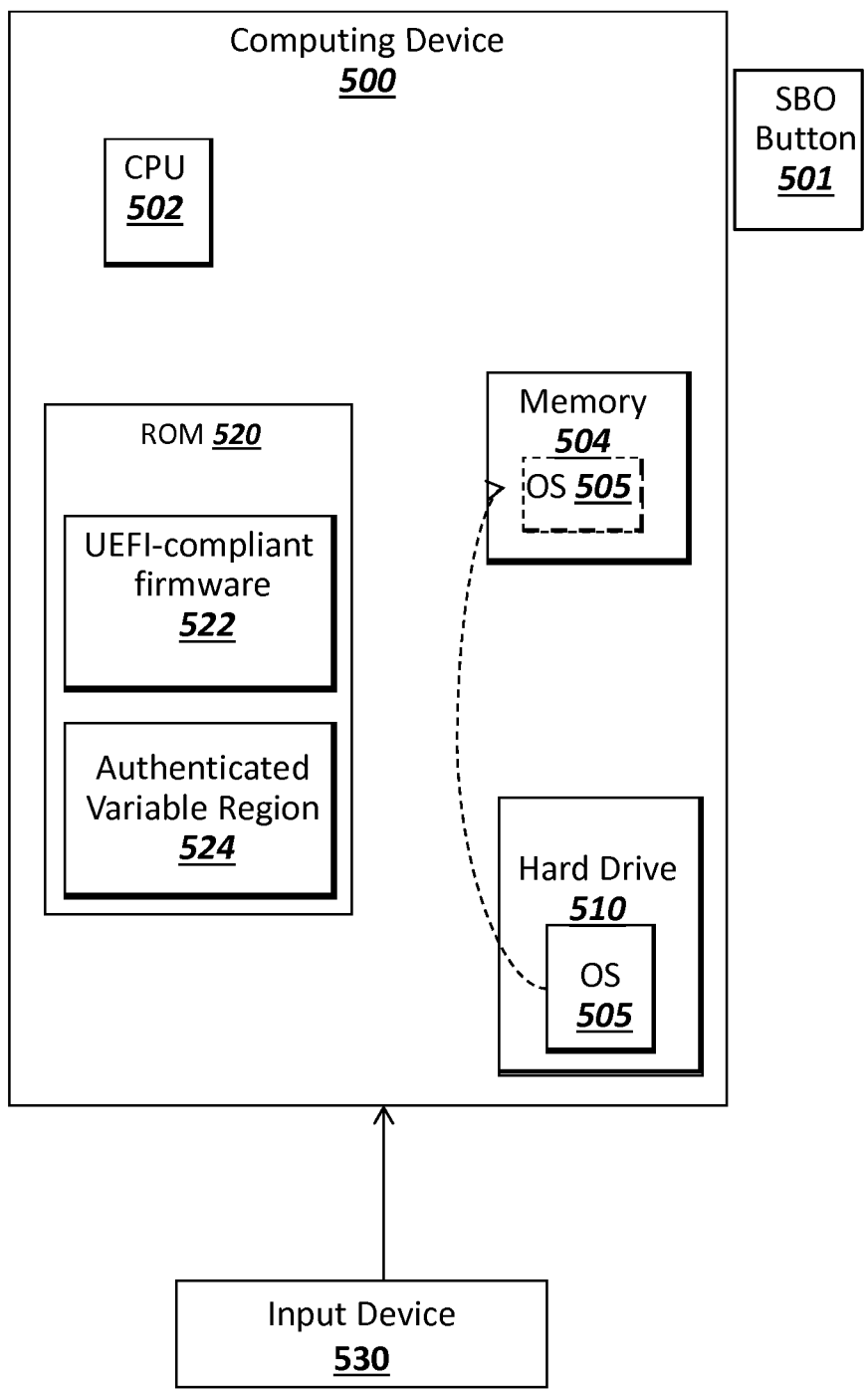
FIG. 5 depicts an exemplary environment suitable for practicing an embodiment of the present invention.

FIG. 5 depicts an exemplary environment suitable for practicing an embodiment of the present invention. A UEFI-compliant computing device 500 includes a CPU 502. The computing device 500 may be a PC, laptop computer, tablet computing device, server, smartphone or some other type of computing device equipped with a processor. The computing device 500 may also include a memory 504 such as Random Access Memory (RAM). An operating system 505 stored on a hard drive 510 in, or in communication with, computing device 500 may be loaded into memory 504 as part of a boot process performed by the computing device.

The computing device 500 may also include ROM 520 which may be flash ROM. In some cases the system design may incorporate multiple ROM devices. ROM 520 holds UEFI-compliant firmware 522 able to perform a Secure Boot sequence as set forth in the UEFI specification and the Secure Boot override sequence described herein. The ROM 520 may include an authenticated variable region 524 holding authenticated variables in a system security database. Authenticated variable region 524 may hold authorized keys used for signature checking as set forth in the UEFI specification.

An input device 530 such as a keyboard may be in communication with the computing device 500. Key presses or combinations of key presses received from the input device 530 may be detected by firmware 522 in the computing device 500 in the manner described above to indicate a Secure Boot override condition during a boot sequence. The computing device 500 may also be equipped with a specialized Secure Boot override power button 501 operable to power on the system while bypassing the UEFI Secure Boot sequence.

In another embodiment, input from keys and/or buttons is used in concert with a security device to indicate that the user is authorized to do the override. For example, the security device may be a hardware or software generated token the user is required to enter in addition to the pressing a button/key(s).

In a different embodiment, the Secure Boot override requires a one-time authorization from an authorized user before it is allowed. In one embodiment, the one-time authorization may be stored prior to the beginning of the boot sequence. In another embodiment the authorization may be input after the user generates a specified override indicator.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A method for bypassing a Unified Extensible Firmware Interface (UEFI) Secure Boot sequence in a computing device equipped with UEFI-compliant firmware, the method comprising:
   beginning, with the UEFI-compliant firmware, execution of a boot sequence for the computing device;
   detecting, during execution of the boot sequence, an indication of a Secure Boot override condition, the indication generated during the boot sequence;
   generating at least one of a visual or audible indicator of the Secure Boot override condition based on the indication generated during the boot sequence—while continuing the boot sequence without entering a BIOS setup application, the continuing of the boot sequence not performing signature checking of an executable based on the detection of the Secure Boot override condition; and
   invoking the executable.

2. The method of claim 1 wherein the executable is an OS loader executable.

3. A non-transitory medium holding computer-executable instructions for bypassing a Unified Extensible Firmware Interface (UEFI) Secure Boot sequence in a computing device equipped with UEFI-compliant firmware, the instructions when executed causing the computing device to:
   begin, with the UEFI-compliant firmware, execution of a boot sequence for the computing device;
   detect, during execution of the boot sequence, an indication of a Secure Boot override condition, the indication generated during the boot sequence;

generate at least one of a visual or audible indicator that the Secure Boot override condition has been detected based on the indication generated during the boot sequence while continuing the boot sequence without entering a BIOS setup application, the continuing of the boot sequence not performing signature checking of an executable based on detection of the Secure Boot override condition; and invoke the executable.

4. The medium of claim 3 wherein the executable is an OS loader executable.

5. A computing device, comprising:

an interface for an input device;

a processor;

read-only memory holding Unified Extensible Firmware Interface (UEFI)-compliant firmware configured to execute a UEFI Secure Boot sequence for the computing device, the UEFI-compliant firmware when executed:

beginning execution of the boot sequence;

detecting, during execution of the boot sequence, an indication of a Secure Boot override condition, the indication generated during the boot sequence;

generating at least one of a visual or audible indicator that the Secure Boot override condition has been detected based on the indication generated during the boot sequence while continuing the boot sequence without entering a BIOS setup application, the continuing of the boot sequence not performing signature checking of an executable based on the detection of the indication of the Secure Boot override condition; and invoking the executable.

6. The computing device of claim 5 wherein the executable is an OS loader executable.

7. The computing device of claim 5 wherein a visual indicator that the Secure Boot override condition has been detected is generated and the computing device further comprises:

an interface to a display surface with which the computing device is in communication, wherein the visual indicator is generated for display on the display surface based on the detecting of the indication of the Secure Boot override condition.

8. A non-transitory medium holding computer-executable instructions for bypassing a Unified Extensible Firmware Interface (UEFI) Secure Boot sequence in a computing device equipped with UEFI-compliant firmware, the instructions when executed causing the computing device to:

begin, with the UEFI-compliant firmware, execution of a boot sequence for the computing device that detects an expansion card in the computing device;

detect, during execution of the boot sequence, an indication of a Secure Boot override condition, the indication generated during the boot sequence;

generate at least one of a visual or audible indicator that the Secure Boot override condition has been detected based on the indication generated during the boot sequence while continuing the boot sequence without entering a BIOS setup application, the continuing of the boot sequence not performing signature checking of a driver for the expansion card based on the detection of the Secure Boot override condition; and load the driver for the expansion card.

9. The method of claim 1 wherein the executable is a driver for an expansion card.

10. The medium of claim 3 wherein the executable is a driver for an expansion card.

11. The computing device of claim 5 wherein the executable is a driver for an expansion card.

12. The method of claim 1, further comprising:

verifying the authority of a user of the computing device to generate the Secure Boot override condition after detecting the indication of the Secure Boot override condition and before a continuing of the boot sequence, the verifying using a hardware or software token entered by a user.

13. The medium of claim 3, wherein the instructions when executed further cause the computing device to:

verify the authority of a user of the computing device to generate the Secure Boot override condition after detecting the indication of the Secure Boot override condition and before a continuing of the boot sequence, the verifying using a hardware or software token entered by a user.

14. The computing device of claim 5, wherein the UEFI-compliant firmware when executed further:

verifies the authority of a user of the computing device to generate the Secure Boot override condition after detecting the indication of the Secure Boot override condition and before a continuing of the boot sequence, the verifying using a hardware or software token entered by a user.

15. The medium of claim 8, wherein the instructions when executed further cause the computing device to:

verify the authority of a user of the computing device to generate the Secure Boot override condition after detecting the indication of the Secure Boot override condition and before a continuing of the boot sequence, the verifying using a hardware or software token entered by a user.

\* \* \* \* \*